United States Patent [19]

Arnold et al.

[11] Patent Number: 4,574,193

[45] Date of Patent: Mar. 4, 1986

[54] METHOD FOR LOGGING FLUID FLOW RATE, WATER FRACTION, AND/OR SALINITY OF WATER FLOWING INTO A WELL

[75] Inventors: Dan M. Arnold; Harry D. Smith, Jr., both of Houston, Tex.

[73] Assignee: Halliburton Company, Duncan, Okla.

[21] Appl. No.: 686,564

[22] Filed: Dec. 26, 1984

[51] Int. Cl.$^4$ .............................................. G01V 5/00
[52] U.S. Cl. ................................... 250/270; 250/266
[58] Field of Search ............... 250/256, 265, 266, 270; 376/165, 166

[56] References Cited

U.S. PATENT DOCUMENTS

| 4,032,780 | 6/1977 | Paap et al. | 250/266 |
| 4,169,979 | 10/1979 | Arnold et al. | 250/266 |
| 4,287,415 | 9/1981 | Arnold | 250/270 |
| 4,501,964 | 2/1985 | Arnold | 250/266 |
| 4,524,272 | 6/1985 | Paap et al. | 250/270 |

*Primary Examiner*—Janice A. Howell
*Attorney, Agent, or Firm*—W. J. Beard

[57] ABSTRACT

The disclosure relates to a well logging method which is capable of providing an indication of salinity and water fraction of the production fluid of a borehole. This indication of borehole parameters may be obtained through the use of a conventional gamma ray logging system that detects gamma rays produced by isotopes created from neutron activation of oxygen, sodium, and chlorine that may be present in the production fluid. A logging sonde is passed twice through a portion of interest in the borehole at two different logging speeds. The fluid velocity relative to the sonde may be determined using these two logging speeds and a displacement distance which reflects the time required for a detector associated with the sonde to reach fluid activated by neutrons produced by the sonde. From these measurements and knowledge of the flow cross-section and parameters of the sonde, the fraction of water in the production fluid and the salinity of the water may be determined for each portion of interest of the borehole.

20 Claims, 9 Drawing Figures

CALIBRATION FACILITY FOR DETERMINATION
OF TOOL GEOMETRIC FACTOR $K_F$

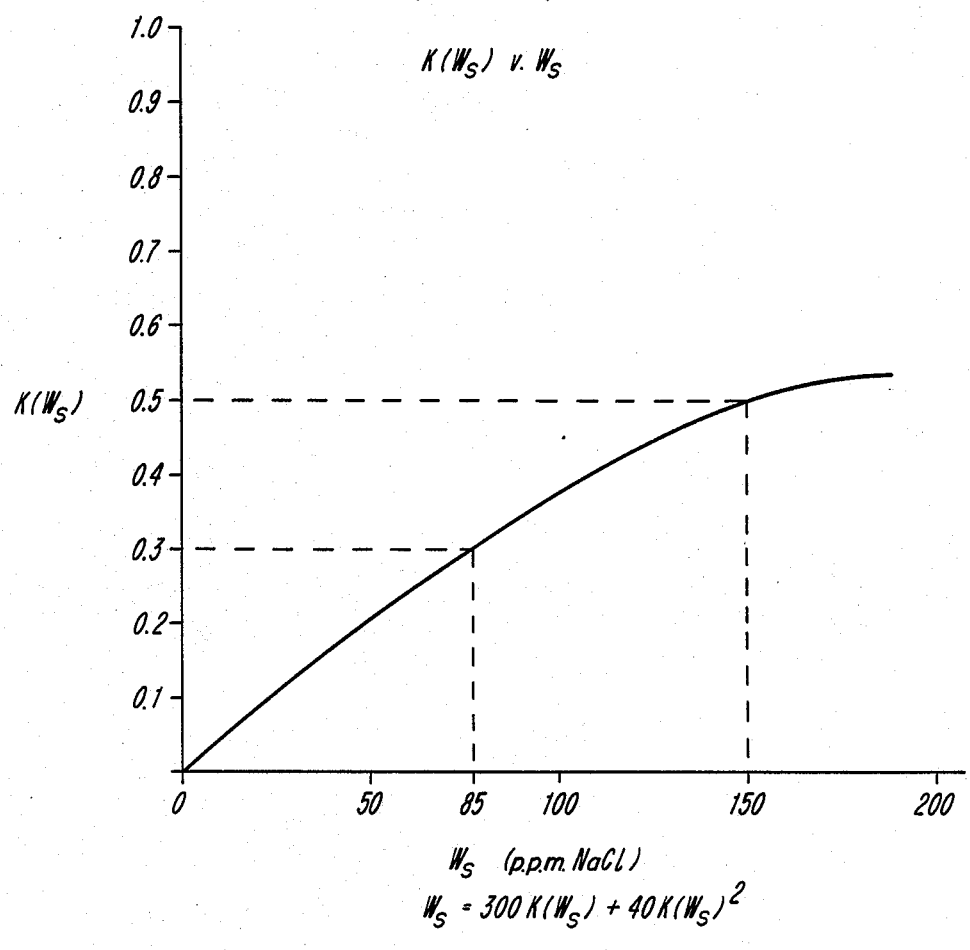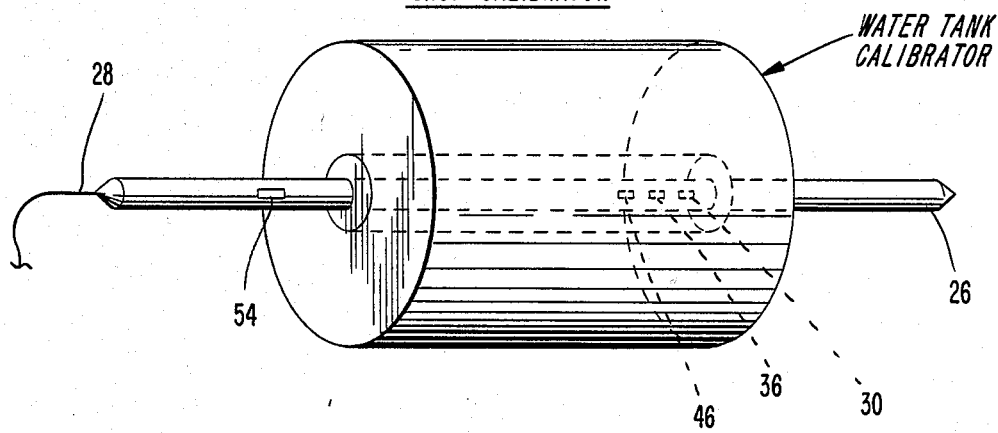

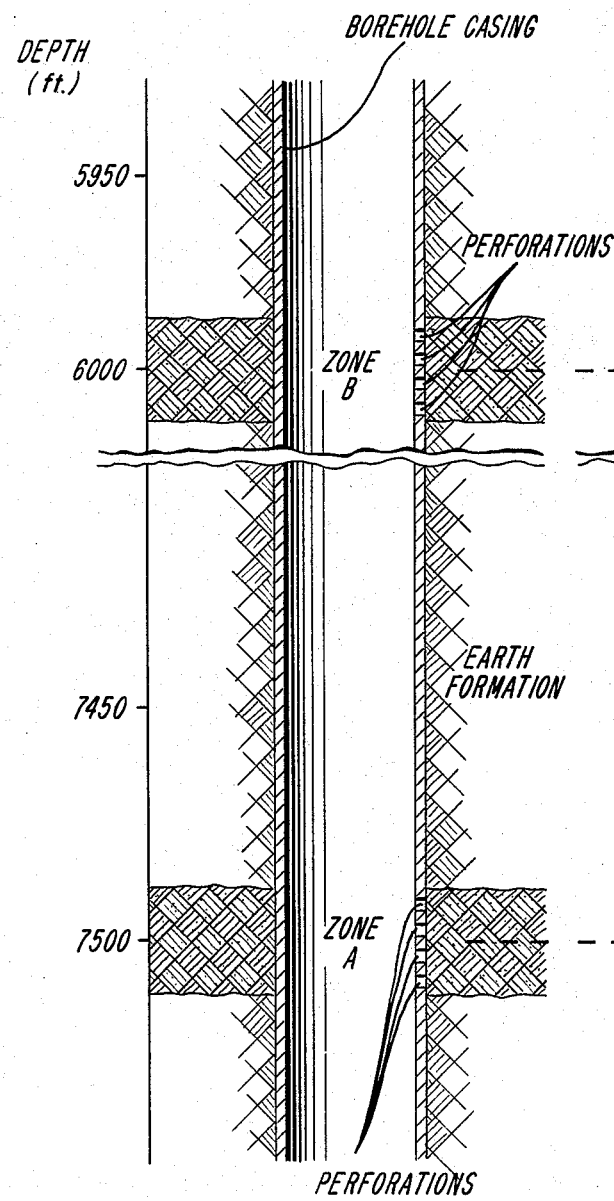
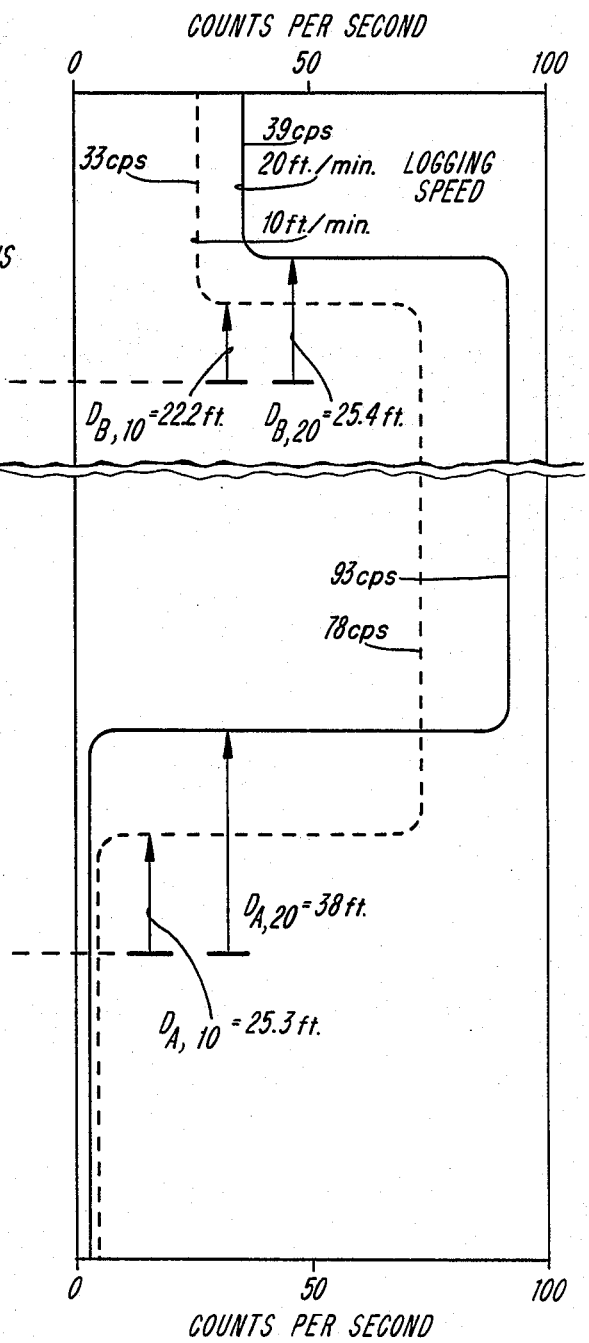

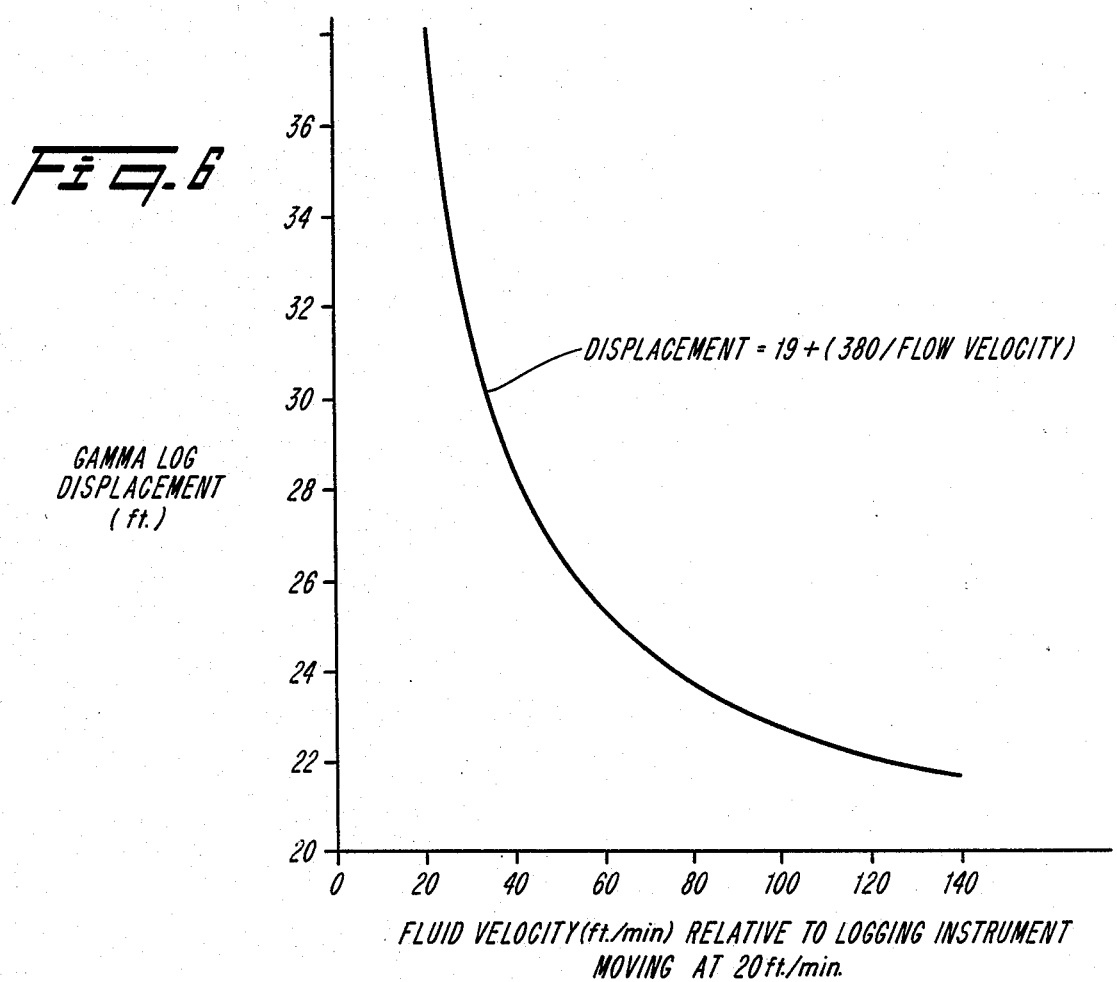
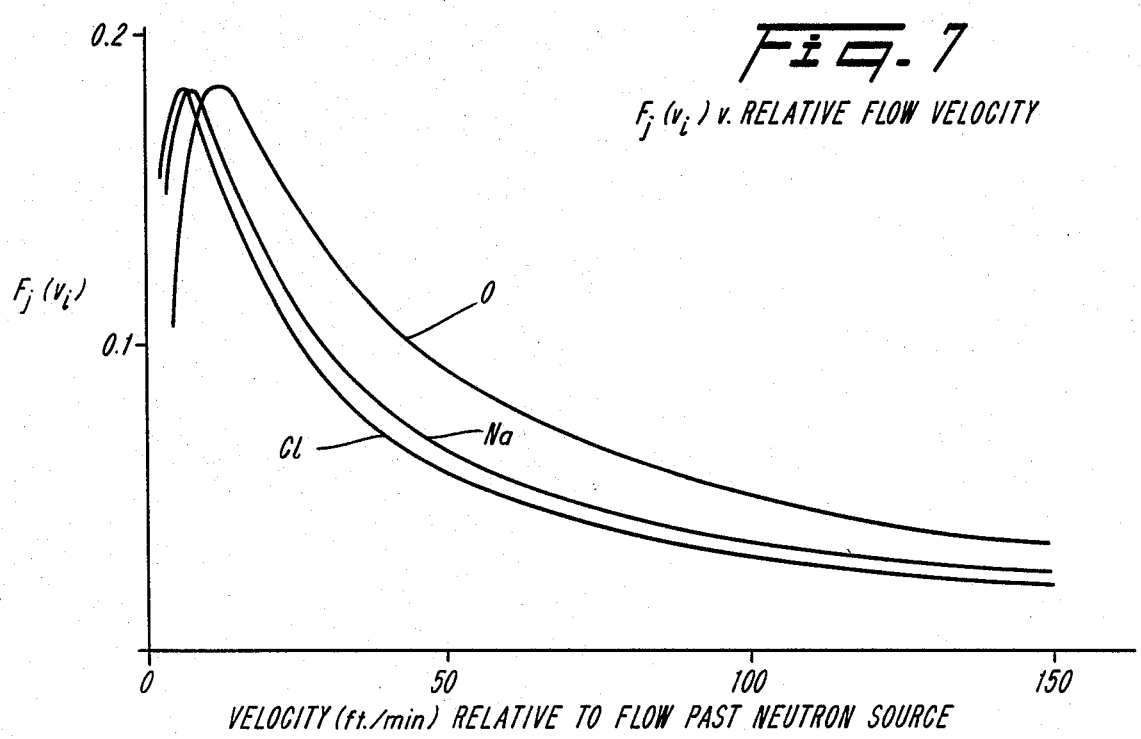

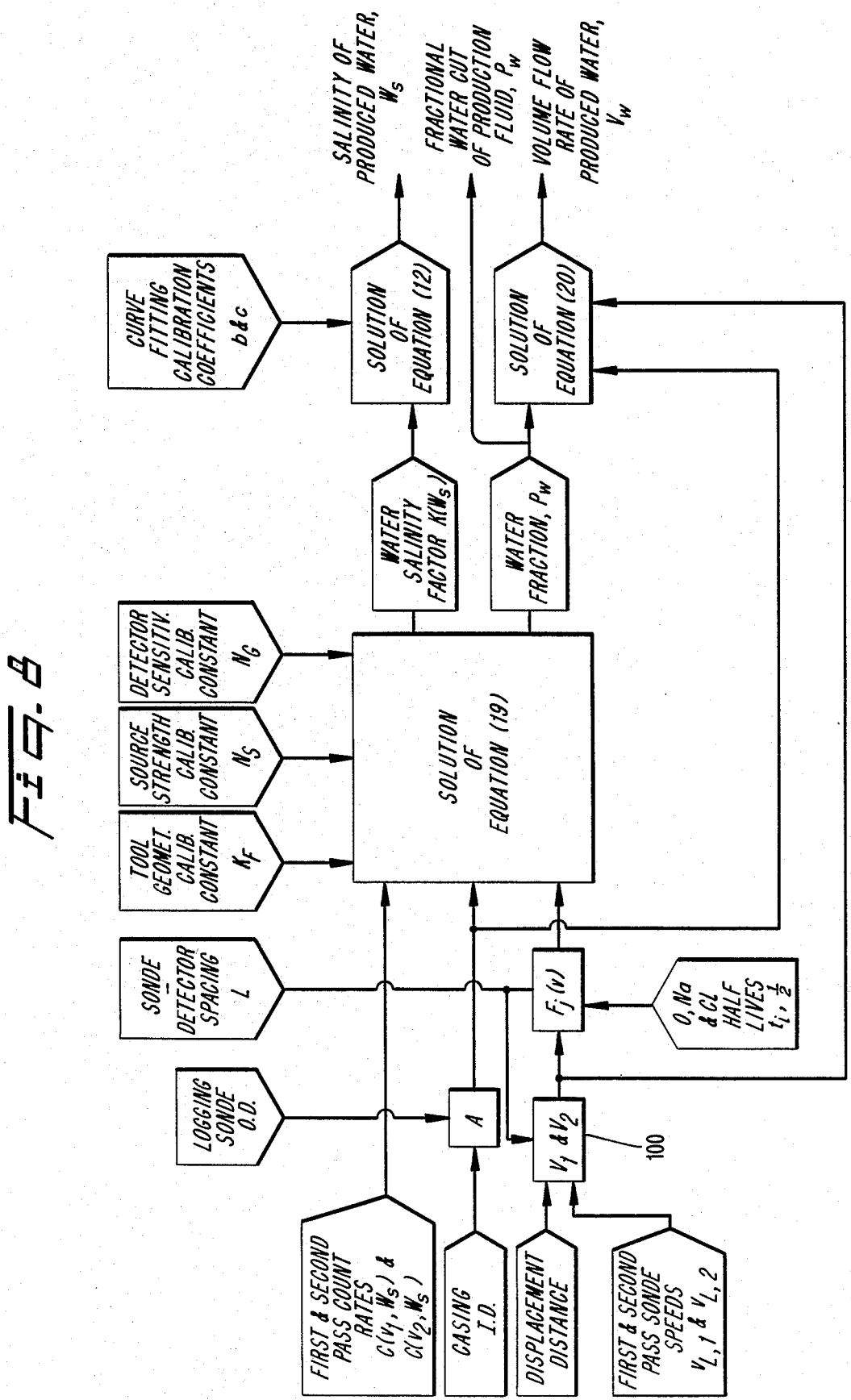

METHOD FOR LOGGING FLUID FLOW RATE, WATER FRACTION, AND/OR SALINITY OF WATER FLOWING INTO A WELL

BACKGROUND OF THE INVENTION

This invention relates to the art of geophysical prospecting in general and to the art of radioactivity well logging in particular. Specifically, the invention relates to logging wherein radiation scattered by fluids passing into and along a borehole is analyzed to provide an indication of the location of fluid entry into the borehole and the composition of the fluid.

In preparation for producing fluids from a borehole such as a cased oil wellbore, it is customary to perforate the casing at various locations along the length of the casing that correspond to projected regions of oil flow. However, these oil flow projections are not always accurate. Occasionally, regions expected to produce substantial oil flow into the borehole produce little or no oil flow at all, or these regions produce fluid flows of widely disparate oil and water content throughout the length of the borehole. Because the fluid produced at the head of the well (production fluid) is a composite of all of the fluids flowing into the borehole through the perforations in the wellbore casing, it would be desirable to identify regions along the length of the wellbore casing that are responsible for the introduction into the borehole of fluids having a low oil content or high water content. Following the identification of such low oil yield regions, appropriate countermeasures such as partial re-casing or re-cementing of the wellbore may be undertaken to improve the quality of the production fluid.

Several methods of water flow monitoring are available for locating various types of fluid movement. One method is discussed in an article by R. McKinley, F. Bower, and R. Rumble, entitled "The Structure and Interpretation of Noise From Flow Behind Cemented Casing", paper SPE 3999, presented at the SPEAIME 47th Annual Fall Meeting (Oct. 8–11, 1972). The article discloses an acoustic logging technique wherein acoustical waves generated by turbulence from high energy fluids is measured to provide an indication of the location of certain types of fluid movement.

Several attempts have been made recently to apply the oxygen activation technique to obtain a volume flow rate of the water phase of the fluid produced by the well using the TMD (Thermal Multigate Decay) pulsed logging system. The oxygen activation technique involves irradiating a borehole environment with neutrons sufficiently energized to induce the transformation of oxygen to an unstable isotope of nitrogen in accordance with the following reaction:

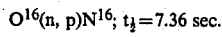
$O^{16}(n, p)N^{16}$; $t_{\frac{1}{2}}=7.36$ sec.

where $t_{\frac{1}{2}}$ represents the half-life of the artificially produced isotope. Due to the inherent instability of the nitrogen isotope, the isotope spontaneously decays back to oxygen while simultaneously emitting gamma rays of characteristic energies. Gamma radiation caused by the decay of the nitrogen isotope is detected by a gamma radiation detector and a representative signal is produced based on this detected gamma radiation. A measure of the oxygen content of the fluid in the vicinity of the detector may be derived from this signal, which measure may be correlated with the amount of water in the fluid.

In an article written by G. Lamb and G. Webber, entitled "Measurement of Water Flow in Deviated Production Wells by Oxygen Activation Logging", SPWLA 24th Annual Logging Symposium, June 27-30, 1983 (paper Z), oxygen activation measurements are conducted without compensating for the significant contribution resulting from the neutron activation of sodium ($Na^{23}(n, \alpha)F^{20}$; $t_{\frac{1}{2}}=10.7$ sec.) and chlorine ($Cl^{37}(n, \alpha)P^{34}$; $t_{\frac{1}{2}}=12.4$ sec.). Because the contributions from sodium and chlorine to the total observed activation are appreciable, failure to take these contributions into account may result in a distorted indication of the composition and flow of water into the borehole along the measured borehole section or interval.

U.S. Pat. No. 4,287,415 to D. M. Arnold, a coinventor herein, pertains to a method for measuring the salinity of water flowing either within or behind the casing of a borehole wherein 14 MeV neutrons are used to irradiate the flowing water in order to induce activation of certain components of the water. Gamma radiation induced from the $O^{16}(n, p)N^{16}$ reaction and either the $Na^{23}(n, \alpha)F^{20}$ or the $Cl^{37}(n, \alpha)P^{34}$ reaction is measured to provide an indication of the salinity of the flowing water. However, this method uses an energy pulse height analyzer to separate sodium, chlorine, and oxygen activation components.

It is desirable to obtain information concerning certain characteristics of the water entering the borehole casing through various sections or intervals along the length of the borehole. Such characteristics include the volume flow rate of the water phase of the production fluid and the salinity of the water phase of the production fluid.

Accordingly, it is an object of the present invention to provide a well logging method which provides an indication of the salinity and volume flow rate of the water phase of the production fluid of a borehole.

Another object of the present invention is to provide a well logging method for the measure of the salinity and volume flow rate of the water phase of the production fluid of a borehole that may be obtained through the use of a conventional gamma ray detection system without the need for special modifications to the system.

Still another object of the present invention is to provide a well logging method that provides an indication of the salinity and volume flow rate of the water phase of the production fluid of a borehole that does not require the use of gamma ray spectroscopy to provide an indication of water salinity.

These and other objects and advantages of the present invention will become apparent from the detailed description that follows.

SUMMARY OF THE INVENTION

The present invention concerns a well logging method which is capable of providing an indication of well logging parameters such as the salinity and volume flow rate of the water phase of the production fluid of a borehole. This indication of borehole parameters may be obtained through the use of a conventional gamma ray detection system operating in a borehole detecting gamma rays produced by isotopes created by thermal neutron activation. Data obtained through this method provides borehole operators with information concerning the composition of the fluid entering the borehole at various positions along the length of the borehole. Thus, the present invention permits the operators to construe the production fluid of the borehole as an aggregate of a plurality of individual borehole fluid components, each component having a particular oil/water ratio. By identifying intervals along the length of the borehole responsible for the introduction into the borehole of fluid having a low oil/water ratio, appropriate measures may be taken to reduce or eliminate the introduction of these low yield fluids into the borehole.

A downhole well logging instrument or sonde is provided with a neutron source and at least one longitudinally-spaced radiation detector located a known distance from the source. Sufficiently energized neutrons emitted or generated by the source pass into the borehole and surrounding borehole environment and activate oxygen, sodium, and chlorine present in any irradiated fluids in the vicinity of the radiation source. The unstable isotopes that result from the activation of these elements spontaneously emit gamma radiation.

The sonde is run through a borehole portion of interest in at least two passes, typically performed at two different logging speeds. Fluid velocity relative to the sonde may be determined using two logging speeds and a displacement distance which reflects the time required for the sonde detector to reach fluid activated by the neutron source. From these measurements and knowledge of the flow cross-section and parameters of the sonde, the fraction of water in the inflowing fluid and the salinity of the water may be determined for each depth of interest.

BRIEF DESCRIPTION OF THE DRAWINGS

FIG. 3 is a graphical illustration of a salinity normalization factor functionally related to water salinity;

FIG. 4 is a schematic illustration of a shop calibrator useful in performing certain calibrations employed in practicing the methods of the present invention;

FIG. 5a is a schematic drawing of portions of a hypothetical borehole and earth formation having two different producing zones;

FIG. 5b graphically correlates activation count rates to the structures and depths illustrated in FIG. 5a;

FIG. 6 is a graphical representation relating gamma log displacement to fluid flow velocity relative to a sonde moving at a known logging speed;

FIG. 7 is a graphical representation relating the mathematical function $F_j(v_i)$ to relative fluid flow velocity past the neutron source of a logging sonde; and FIG. 8 is a diagrammatic representation of steps employed in producing signals related in value to the water fraction and salinity of produced water.

DETAILED DESCRIPTION OF THE PREFERRED EMBODIMENT

Figure 1:
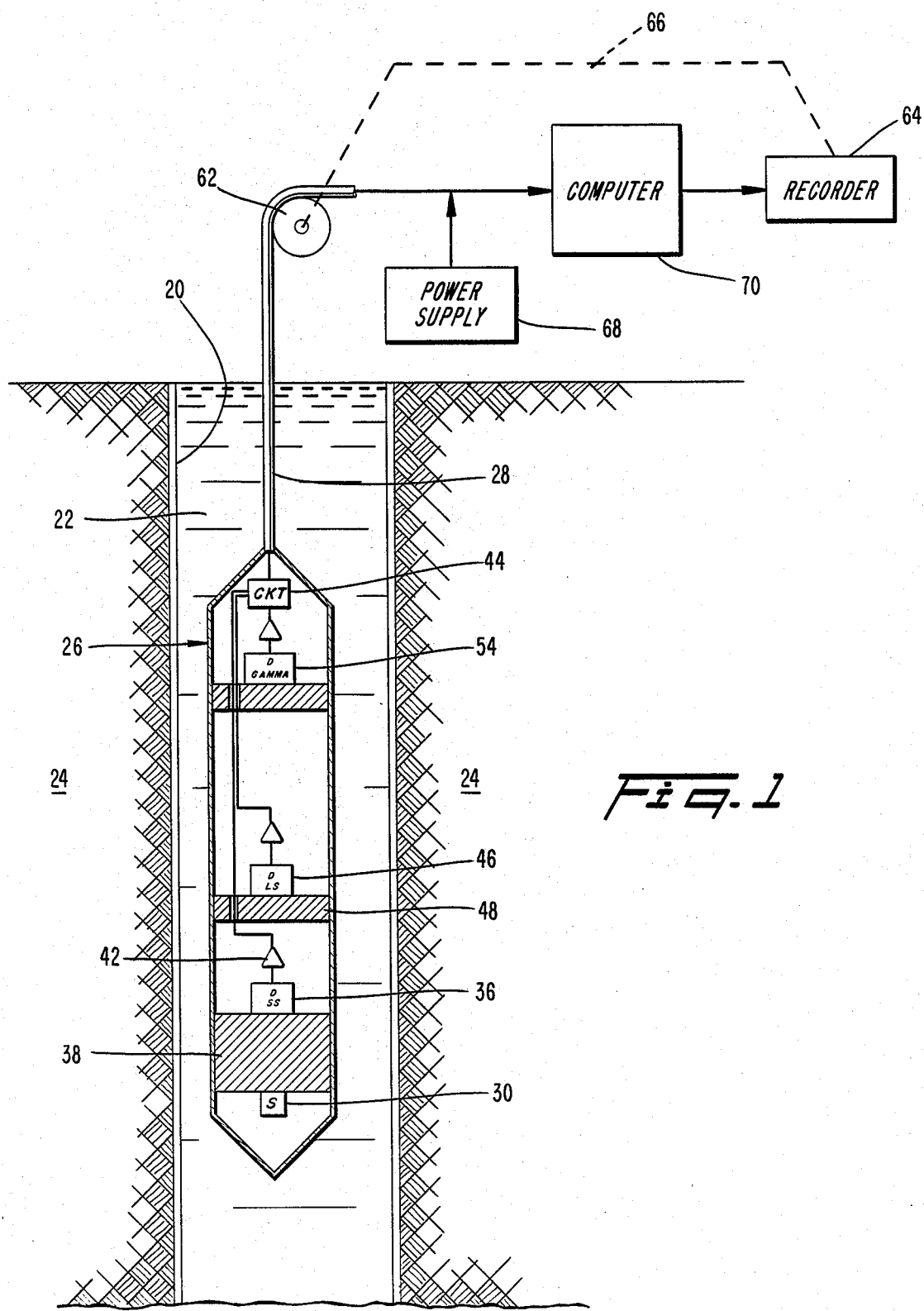
FIG. 1 is a schematic illustration showing a well logging system capable of performing the methods of the present invention.

With reference to FIG. 1, a well logging system is depicted which is capable of practicing the methods herein disclosed. A well borehole 20 filled with production fluid 22 is shown penetrating an earth formation 24. A TMD well logging instrument, indicated generally by the numeral 26, is suspended longitudinally from an upper end of the sonde 26 in the borehole 20 by well logging cable 28 which is of the conventional armored type used in the art.

Located near a lower end of the sonde 26 is a source 30 of penetrating radiation. In preferred embodiments, the source 30 is a continuous chemical or accelerator neutron source capable of producing high energy neutrons having an energy level of no less than approximately 10 MeV. In a preferred embodiment, the source 30 is a pulsed, generator source producing essentially monoenergetic 14 MeV neutrons.

Longitudinally spaced from the radiation source 30 along the vertical or longitudinal axis of the borehole 20 is a first short-spaced radiation detector 36. The detector 36 may be isolated by radiation shielding material 38 from the neutron source 30 to minimize neutrons from directly impinging upon the detector 36. Detector 36 detects gamma radiation produced from the decay of the unstable oxygen, sodium, and chlorine activation products discussed above. The detector 36 may comprise a sodium iodide scintillation (thallium activated) crystal or a cesium iodide (thallium activated) crystal or a bismuth germinate detector of a desired configuration. Impingement upon the detector 36 of emitted gamma radiation causes electrical signals to be generated by the detector, which signals may be amplified by an amplifier 42 located within the sonde 26 and transmitted to the surface by means of a cable driver circuit 44 and the well logging cable 28.

A second longitudinally spaced radiation detector 46, spaced a greater distance from the source 30 than is detector 36, may likewise be isolated by radiation shielding material 48 from the neutron source 30 to minimize neutrons from directly impinging on detector 46. Detector 46 detects radiation produced by the decay of the activation products of oxygen, sodium, and chlorine. Detector 46 may be constructed in the same manner as detector 36 and connected to the well logging cable in a similar manner.

Similarly, a third longitudinally spaced detector 54 may be provided an even greater distance from the source 30 than is either of the detectors 36, 46.

The well logging cable 28 to which the sonde 26 is connected at one end may pass over a sheave wheel 62 located on the surface of the earth. Revolution of the sheave wheel 62 may be either electrically or mechanically coupled to a well logging recorder 64, as indicated by the dotted line 66. Coupling of the sheave wheel to the recorder in this fashion enables measurements conducted by the sonde 26 to be recorded as a function of borehole depth. The sheave wheel may also be employed to detect logging speed, i.e., the speed of vertical movement of the sonde through the borehole.

A power supply 68 located at the surface of the earth provides power for the operation of the well logging instrument 26 by way of conductors located within the well logging cable 28. It is understood by those skilled in the art that the logging instrument contains appropriate equipment for converting the power provided by the power supply 68 to appropriate voltages for use by the detectors 36, 46, 54 and associated equipment located within the sonde 26.

A computer 70 comprising memory and processing circuitry located at the surface of the earth receives signal input from at least one of the detectors 36, 46, 54 and, in a manner which is discussed in detail below, analyzes the signal input to provide an indication of borehole fluid parameters such as salinity and water volume flow rate. A general purpose computer may be utilized to analyze the data input transmitted from the well logging instrument 26. As discued above with reference to the sheave wheel 62 and recorder 64, these borehole fluid parameters may be recorded by the recorder 64 as a function of borehole depth.

The theory underlying the concepts embodied in the present invention is that, when a unit volume of material is irradiated with sufficiently energized neutrons from a neutron source for a period of time $t_A$, a count rate due to the neutron-induced radioactive isotopes within the material recorded by a detector at a time $t_D$, measured from the termination of neutron irradiation, is $$C \propto N(1-e^{-\lambda t_A})e^{-\lambda t_D} \quad (1)$$

where N is a term proportional to the neutron source strength and detector efficiency; $\lambda$ is the decay constant of the induced activity ($\lambda = 0.693/t_{178}$); and $t_{178}$ is the half life of the induced activity. If the unit volume of material is contained within a fluid stream moving at a linear velocity v past the neutron source, and the detector measuring the count rate (activity) of the material is spaced a distance L from the neutron source, then $$t_D \cong L/v \quad (2)$$

The effective time which the unit volume of material within the moving stream is irradiated with neutrons is $$t_A \cong G/v \quad (3)$$

where G represents a "geometric factor" of the source. The relationship $t_A \cong G/v$ may be substituted in equation (1) to yield the expression $e^{-\lambda t_A} = e^{-\lambda G/v}$ which may be expaned to give $$e^{-\lambda G/v} = 1 - \lambda G/v + \frac{(\lambda G/v)^2}{2!} + \ldots \quad (4)$$

For the $O^{16}(n, p)N^{16}$ reaction, $\lambda = 5.83$ min.$^{-1}$. When analyzing fast neutron reactions in a liquid sample, a good approximation of G is G=1.0 ft. For a fluid stream flow velocity relative to the source and detector(s) of v=20 ft./min., the following from equation (4) is true:

$$\lambda G/v = 0.292 \quad (5)$$

$$\frac{(\lambda G/v)^2}{2} = 0.0424$$

Therefore, for fluid stream flows relative to the source and detector(s) of $v \cong 20$ ft./min., equation (4) may be approximated as:

$$e^{-\lambda G/v} \cong 1 - \lambda G/v \quad (6)$$

Substituting equations (2) and (6) into equation (1) yields:

$$C \propto \frac{N\lambda e^{-\lambda L/v}}{v} \quad (7)$$

where the terms N, C, and $\lambda$ are known quantities.

As has been discussed above, the count rate data obtained from the irradiation of the fluid stream is the result of the decay of the activation products of oxygen, sodium, and chlorine. Because each activation product has a characteristic half-life ($t_{\frac{1}{2}}$), it is helpful to define a mathematical term $F_j(v)$, where $$F_j(v) = \frac{\lambda_j}{v} e^{-\lambda_j L/v} \quad (8)$$

and j signifies a particular target isotope (oxygen, sodium, or chlorine).

In applying the neutron activation technique to make various production log measurements, one must account for the respective velocities of the logging instrument and production fluid. Accordingly, it is necessary to define the following velocity terms:

v = true linear flow velocity of the water phase of the production fluid $v_L$ = velocity of the logging instrument $v_i = v - v_L$ = linear flow velocity of the water phase of the production fluid relative to the logging instrument Additionally, the following terms will be used in the development of the concepts necessary to understand the present invention:

A = cross sectional area of an annulus defined by the inner diameter of the borehole casing and the outer diameter of the logging sonde $W_s$ = salinity of the produced water $C(v_i, W_s)$ = count rate recorded at relative logging speed $v_i$ when the water salinity is $W_s$ $P_w$ = fractional water cut of the liquid production phase $K(W_s)$ = a normalization factor proportional to water salinity $K_F$ = a tool geometrical factor $N_S$ = a source strength parameter ($N_S = 1.00$ for "standard" logging instrument)

$N_G$ = a detector sensitivity parameter ($N_G = 1.00$ for a "standard" logging instrument)

$V_W$ = volume flow rate of the produced water.

For a logging instrument moving at a velocity $v_L$ and production fluid moving at $v_i = v - v_L$, the count rate $C(v_i, W_s)$ recorded by the gamma ray detector is $$C_{(v_i, W_s)} = N_S N_G K_F A F_O(v_i) P_w + N_S N_G K_F A F_{Na}(v_i) P_w K(W_s) + N_S N_G K_F A F_{Cl}(v_i) P_w K(W_s) \quad (9)$$

Equation (9) assumes that $C(v_i, W_s)$ varies approximately linearly with respect to A, the cross-sectional area of the borehole casing-logging instrument annulus. This assumption and the relation of terms expressed in equation (9) above is a reasonable approximation in casings smaller than 10-12 inches in diameter.

Equation (9) may be simplified to an expression involving two unknowns, $P_w$ (the fractional water cut of the liquid phase of the production fluid which, upon determination of v and A, may be converted to water volume flow rate $V_W$), and $K(W_s)$ (a term which may be related to production water salinity, $W_s$, as detailed below). The calibration constants $N_S$, $N_G$ and $K_F$ are readily determined from calibration of the logging instrument in a calibration facility; the terms $F_j(v_i)$ for each of the activation products may be determined from equation (8); the cross sectional area A of the borehole casing-logging instrument annulus is calculated from the relationship between the instrument outer diameter and the casing inner diameter; and $C(v_i, W_s)$ is measured by at least one of the detectors of the logging instruments.

Figure 2:
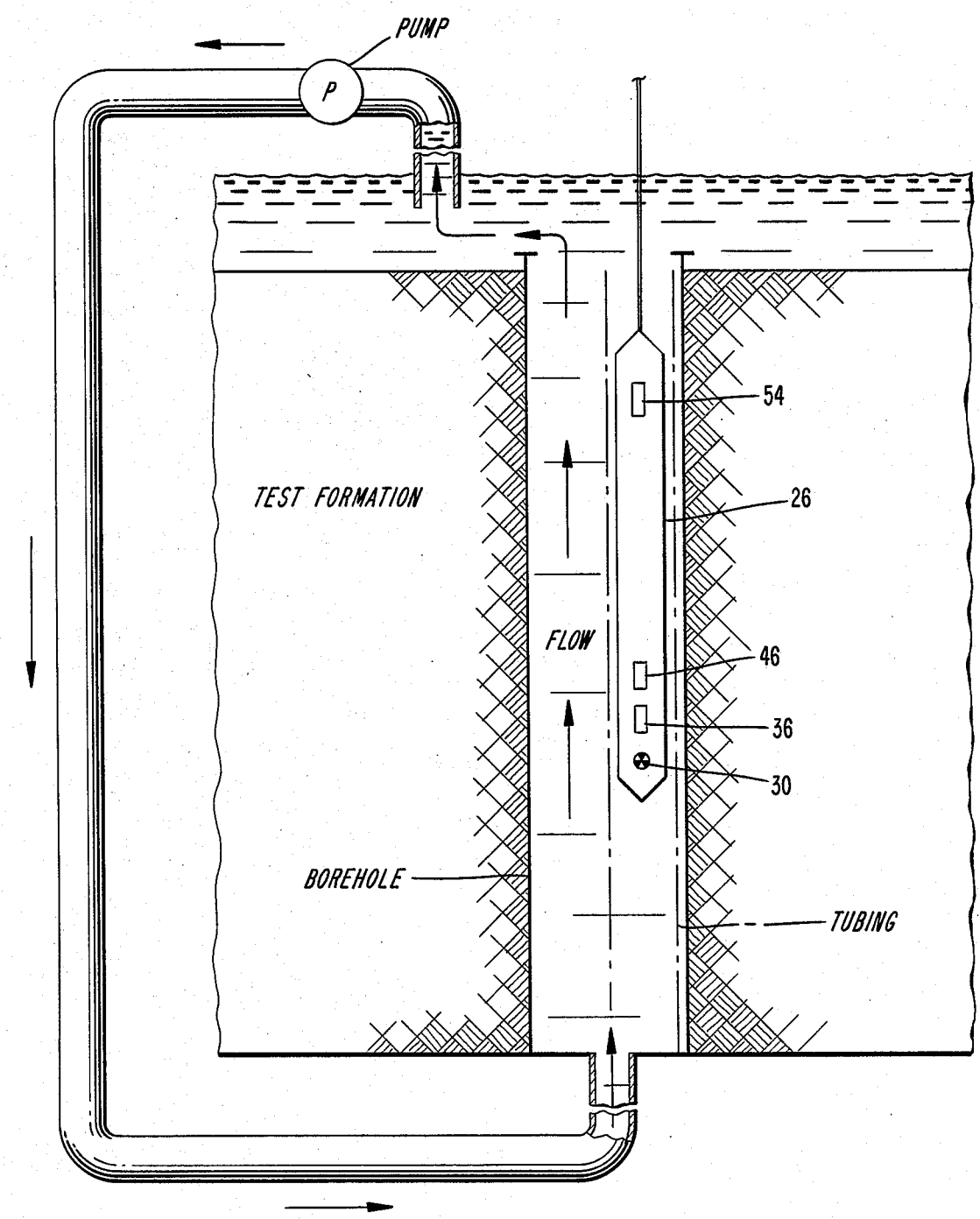
FIG. 2 is a schematic illustration showing the well logging system of FIG. 1 located in a test borehole and formation in which calibration is performed.

The tool geometrical factor, $K_F$, may be determined by placing the logging instrument 26 within a borehole of a calibration facility as shown in FIG. 2. This determination may be made with or without the borehole tubing depicted in the figure. A measure of the respective instrument and borehole outer diameters is taken and the cross-sectional area A of the casing-logging instrument annulus is calculated. Fresh water ($P_w=1.0$, $K(W_s)=0$) is circulated as shown in FIG. 2 at a linear flow rate $v_c$. The oxygen activation count rate $C(v_c, W_s=0)$ is recorded, and the tool geometric factor $K_f$ may then be calculated from equation (9), which yields:

$$K_F = \frac{C(v_c, W_s = 0)}{AF_O(v_c)} \quad (10)$$

where all of the terms comprising $K_F$ are measured ($C(v_c, W_s=0)$), known (A), or calculable ($F_O(v_c)$). As $K_f$ is a function of tool design, it is not necessary to routinely determine $K_f$ before each well logging assignment.

Similarly, the normalization factor $K(W_s)$ may be determined by again placing the logging instrument 26 within the borehole of a calibration facility as depicted in FIG. 2. Water of at least two known salinities ($W_{s,1}$ and $W_{s,2}\neq 0$, $P_w=1.0$) may be circulated at a linear flow velocity $v_c$ for each of the two required $K(W_s)$ calibration runs. Corresponding count rates $C(v_c, W_{s,1})$ and $C(v_c, W_{s,2})$ are recorded, and equation (9) is used to solve for $K(W_s)$ for at least two known values of $W_s$:

$$K(W_s) = \frac{C_{(v_c, W_s)} - K_F A F_O(v_c)}{K_F A (F_{Na}(v_c) + F_{Cl}(v_c))} \quad (11)$$

where the terms comprising the value $K(W_s)$ are either known or previously determined. Unless the tool design is modified, the value $K(W_s)$ need only be determined once.

The functional reltionship between $K(W_s)$ and $W_s$ is determined by fitting a curve through the observed data. This functional relationship may be approximated by the following equation:

$$W_s = bK(W_s) + c(K(W_s))^2 \quad (12)$$

where the coefficients b and c represent constants relating the graph data obtained for $K(W_s)$ and $W_s$. Physically, the relationship between $K(W_s)$ and $W_s$ should to the first approximation be linear. FIG. 3 is a hypothetical illustration predicting the relationship between $K(W_s)$ and $W_s$ in accordance with equation (12).

Shop calibration of the neutron source strength $N_S$ and detector efficiency $N_G$ parameters is necessary to normalize the response of any logging instrument to that of a "standard" instrument. The calibration procedure assumes that the long-spaced TMD detector 46 will be used to detect activation gamma radiation. In principle, either the short-spaced TMD detector 36 or gamma ray detector 54 may also be used for this calibration procedure and in the logging methods described below.

The instrument 26 is placed within a horizontal shop water calibration tank, as shown in FIG. 4. The source 30 is turned "on", and the detector count rate is recorded. The product $N_S N_G$ is computed from the equation $$N_S N_G = \frac{C_{LS}^{STD}}{C_{LS}} \quad (13)$$

where $C_{LS}$ is the count rate recorded using the "field" instrument and $C_{LS}^{STD}$ is the count rate recorded under identical conditions using the "standard" instrument. If the natural gamma ray detector 54 of the TMD instrument is used to measure activation radiation, a different technique must be used since the standard TMD calibration tank is not sufficiently long to contain both the neutron source 30 and the gamma ray detector (See FIG. 4). When the gamma ray detector 54 is used, $$N_S = \frac{C_{LS}^{STD}}{C_{LS}} \times \frac{C_{LS,API}^{STD}}{C_{LS,API}} \quad (14)$$

$$N_G = \frac{C_{G,API}^{STD}}{C_{G,API}}$$

where $C_{LS,API}$ = net long spaced detector reading with API gamma ray detector calibrator in place.

$C_{G,API}$ = net gamma ray detector count rate with API gamma ray detector calibrator in place.

The superscript "STD" refers to corresponding detector count rate readings using the "standard" logging instrument. The term "API" refers to a standardized unit of gamma radiation developed by the American Petroleum Institute that is known to those skilled in the art of well logging.

Following calibration of the logging instrument 26 as discussed above, the interval of the borehole that is of interest is logged at a logging speed $v_{L,1}$. The linear flow velocity $v_1$ of the water phase of the production fluid is measured, and first count rate data $C(v_1, W_s)$ is recorded. The interval of interest is logged a second time at a different logging velocity $v_{L,2}$, and $v_2$ and $C(v_2, W_s)$ are recorded. From equation (9) above, the following relationships are determined:

$$C_{(v_1, W_s)} = N_S N_G K_F P_w A (F_O(v_1) + K(W_s)[F_{Na}(v_1) + F_{Cl}(v_1)])$$

$$C_{(v_2, W_s)} = N_S N_G K_F P_w A (F_O(v_2) + K(W_s)[F_{Na}(v_2) + F_{Cl}(v_2)]) \quad (15)$$

or $$C_{(v_1, W_s)} = X_1 P_w + Y_1 P_w K(W_s)$$

$$C_{(v_2, W_s)} = X_2 P_w + Y_2 P_w K(W_s) \quad (16)$$

where $$X_1 = N_S N_G K_F A F_O(v_1)$$

$$X_2 = N_S N_G K_F A F_O(v_2)$$

$$Y_1 = N_S N_G K_F A (F_{Na}(v_1) + F_{Cl}(v_1))$$

$$Y_2 = N_S N_G K_F A (F_{Na}(v_2) + F_{Cl}(v_2)) \quad (17)$$

All terms in equation (17) are measured, known or may be determined using techniques discussed herein. Accordingly, equation (16) may be solved simultaneously for $P_w$ and $K(W_s)$, yielding:

$$P_w = \frac{C_{(v_1,W_s)}Y_2 - C_{(v_2,W_s)}Y_1}{(X_1Y_2 - Y_1X_2)} \quad (18)$$

$$K(W_s) = \frac{C_{(v_2,W_s)}X_1 - C_{(v_1,W_s)}X_2}{C_{(v_1,W_s)}Y_2 - C_{(v_2,W_s)}Y_1} \quad (19)$$

The water phase flow rate of the production fluid is determined from the relationship:

$$V_w = P_w A v \quad (20)$$

The water phase salinity may be determined from equation (12) using $K(W_s)$ from (19), yielding:

$$W_s = bK(W_s) + c(K(W_s))^2 \quad (21)$$

where the variables b and c represent the curve-fitting values obtained for equation (12).

FIG. 8 summarizes steps which may be taken to obtain the desired logging parameters. Data which may be obtained at the logging site is listed along the left hand margin of FIG. 8. This data includes sonde pass velocities, associated count rate data, casing inner diameter and displacement distance (discussed below). Parameters characteristic of the sonde are treated as knowns and are shown along the upper margin of FIG. 8. These known parameters include sonde outer diameter, detector spacing L, the calibration constants $K_F$, $N_S$ and $N_G$, and the curve fitting coefficients b and c. Finally, values for the half lives $t_{i,\frac{1}{2}}$ for gamma decay of the activation products are treated as knowns.

The determination of relative velocities $v_1$ and $v_2$ from pass speeds $v_{L,1}$ and $v_{L,2}$, detector spacing L and displacement distance D is indicated schematically at block 100. This determination may be made with the aid of predetermined data such as that shown in the graph of FIG. 6. The nature of this determination is discussed in detail below in connection with the following hypothetical illustration of the practice of the methods of the present invention.

The following hypothetical illustration is provided to show how $P_w$, the fractional water cut of the production fluid, $W_s$, the salinity of the produced water, and $V_W$, the volume flow rate of the production fluid along a particular interval of the borehole may be determined.

FIG. 5a depicts a hypothetical cased borehole in an earth formation having two casing perforation zones, A and B. Fluid comprising oil and water may flow through the casing perforations and into the borehole from the surrounding earth formation and mix with fluid already present within the borehole. In this example, zone A is located approximately 7,500 ft. below the surface of the earth and zone B is located approximately 6,000 ft. below the surface of the earth. Up to this point in the borehole analysis, it is not known whether fluid is in fact entering the borehole through these respective perforation zones. Further, neither the composition nor the fluid flow velocity of the fluid that may be entering the borehole through these perforation zones is known. Accordingly, it is desirable to utilize the present invention in order to ascertain these unknown factors of interest.

Two logging passes of the logging instrument past these respective zones are performed, the two logging passes occurring at different velocities. For this example, the logging speed for pass no. 1 is assumed to be 20 ft./min. and the logging speed for pass no. 2 is assumed to be 10 ft./min. With respect to zone A, the following data is observed:

$C(v_1, W_s) = 93$ counts/sec.

$C(v_2, W_s) = 78$ counts/sec.

Each zone has a gamma ray displacement D which corresponds to the vertical distance from the mid-point of each perforation zone before which irradiated fluid is detected by the moving logging instrument. For zone A, the value of $D_A$ for each logging pass is:

at logging speed $v_L$ (20) = 20 ft./min., $(D_{A,20}) = 38$ ft.

at logging speed $v_L$ (10) = 10 ft./min., $(D_{A,10}) = 25.3$ ft.

Thus, for zone A, a slower logging speed results in detection of the irradiated fluid entering the borehole at a shorter vertical displacement from the mid-point of the perforation zone than does detection at a faster logging speed The relative fluid velocities above the perforation may be determined graphically for a logging instrument moving at 20 ft./min. FIG. 6 illustrates the relationship between gamma log displacement D and fluid velocity relative to a logging instrument moving at 20 ft./min. When the logging instrument is not operating at 20 ft./min., the fluid velocity relative to the velocity of the logging instrument may be determined from the equation:

$$D = L\left[1 + \frac{\text{Logging Velocity }(v_L)}{\text{Relative Fluid Velocity }(v_i)}\right] \quad (22)$$

where the value L represents the gamma detector-neutron source separation distance in a standard TMD logging instrument, which distance is typically 19 ft. Since the values representing the gamma displacement and logging speed are known, equation (22) may be solved to yield the relative fluid velocity as follows:

$$\text{relative fluid velocity }(v_i) = \frac{L \times \text{logging velocity }(v_L)}{D - L}$$

Utilizing the values obtained for the two logging passes, the following relative fluid velocities are obtained:

$v_1 = 20$ ft./min.

$v_2 = 30$ ft./min.

From the foregoing, it follows that the absolute or true fluid velocity $v[v = v_i + v_L, (i = 1, 2)]$ is 40 ft./min. Using hypothetical values of $N_S, N_G$, and $K_F$, the product $N_S \times N_G \times K_F$ is assumed to be 10 Counts/sec./in.$^2$/ft. Assuming a 7 inch casing inner diameter and a 1 11/16 inch instrument outer diameter, the cross-sectional area of the casing-instrument annulus A is calculated to be:

$A = 38.5$ in.$^2$

With reference to FIG. 7, which graphically illustrates the relationship between $F_j(v_i)$ and $v_i$, the relative flow velocity of the fluid past the neutron source of the logging instrument, the following values are obtained:

| | |
|---|---|
| $F_O(20) = 0.163$ | $E_O(30) = 0.132$ |
| $F_{Na}(20) = 0.132$ | $F_{Na}(30) = 0.100$ |
| $F_{Cl}(20) = 0.121$ | $F_{Cl}(30) = 0.090$ |

Inserting these values into their respective positions in equation (17) produces the following set of values:

$X_1 = 62.7$ Counts per second $X_2 = 50.8$ Counts per second $Y_1 = 81.6$ Counts per second $Y_2 = 73.1$ Counts per second Inserting the above-listed values into equations (18) and (19), the following values for the fractional water cut of the liquid production fluid and the salinity normalization factor, respectively, are obtained:

$P_w = 0.9$ $K(W_s) = 0.5$

Using the hypothetical relationship between $W_s$ and $K(W_s)$ depicted in FIG. 3, the following value is obtained for the salinity of the production fluid:

$W_s = 150,000$ ppm NaCl

From equation (20), where the term Z is included as a proportionality constant to provide a measure of flow in barrels per day, the following value is obtained for the volume flow rate of the produced water:

$$V_w = P_w \times A \times v \times Z$$
$$= (0.9) \times (38.5) \times (40) \times Z$$
$$= 2,700 \text{ barrels/day}$$
$$V_{Oil} = V_{Total} - V_{Water}$$

Accordingly, Zone A is determined to be producing 2,700 bbl/day of (150,000 ppm NaCl) salt water and 300 bbl/day of oil. With respect to zone B, the following is observed:

$C(v_1, W_s) = 39$ c.p.s.

$C(v_2, W_s) = 33$ c.p.s.

The gamma ray displacement from the mid-point of the zone B perforations is:

at $v_L(20) = 20$ ft./min., $(D_{B,20}) = 25.4$ ft.

at $v_L(10) = 10$ ft./min., $(D_{B,10}) = 22.2$ ft.

Following the same procedure detailed with respect to zone A, the following relative fluid velocities are obtained:

$v_1 = 40$ ft./min.

$v_2 = 50$ ft./min.

Accordingly, the absolute or true fluid velocity $v$ [$v = v_i + v_L$, $(i=1,2)$] is 60 ft./min. From FIG. 7, the following values are obtained:

| | |
|---|---|
| $F_O(40) = 0.110$ | $F_O(50) = 0.093$ |
| $F_{Na}(40) = 0.080$ | $F_{Na}(50) = 0.066$ |
| $F_{CL}(40) = 0.071$ | $F_{CL}(50) = 0.059$ |

Substituting the values listed above into equation (17), the following values are obtained:

$X_1 = 42.3$ c.p.s.

$X_2 = 35.8$ c.p.s.

$Y_1 = 56.2$ c.p.s.

$Y_2 = 48.1$ c.p.s.

Inserting the above-listed values into equations (18) and (19) yields the following values for the fractional water cut of the liquid production fluid and the salinity normalization factor, respectively:

$P_w = 0.66$ $K(W_s) = 0.3$

The hypothetical relationship between $W_s$ and $K(W_s)$ depicted in FIG. 3 indicates the following value for the salinity of the produced water:

$W_s = 85,000$ ppm NaCl

Using equation (20) and the proportionality constant Z, the following value for the volume flow rate of the produced water is determined:

$V_w = 3,000$ bbl/day $V_{Oil} = V_{Total} - V_{Water} = 1,500$ bbl/day

Above zone B, the total fluid flow is 4,500 bbl/day, of which 3,000 bbl/day is water and 1,500 bbl/day is oil. Because it has been determined that zone A is producing most of the water (2,700 bbl/day) and only a small fraction of the oil output of the well (300/1,500), it may be desirable to "plug" the casing perforations comprising zone A and produce only from zone B.

As illustrated by the hypothetical example, the methods of the present invention are useful in determining flow and composition parameters of fluid inflow into a borehole as a function of well depth. This data may be recorded in a conventional manner to provide a useful log of the well.

Although the invention has been described in connection with preferred embodiments, it is understood that variations and modifications may be resorted to as will be apparent to those skilled in the art. Such variations and modifications are to be considered within the purview and the scope of the claims appended hereto.

What is claimed is:

1. A method for logging salinity of water in fluids flowing into a portion of a borehole, comprising the steps of:

moving a logging sonde along a longitudinal axis of the portion of the borehole at a first relative velocity between the sonde and the fluids in the borehole while irradiating fluids in the portion of the borehole with neutrons from a neutron source carried by the sonde, said neutrons being sufficiently energetic to induce activation of oxygen, sodium and chlorine in said fluids;

detecting gamma rays induced by said activation with at least one detector carried by the sonde at a location longitudinally displaced from the neutron source; and generating a first count rate signal responsive to gamma rays detected at said first velocity;

moving the logging sonde along the same portion of the borehole at a second relative velocity between the sonde and the fluids in the borehole while irradiating fluids in the portion of the borehole with neutrons from said neutron source;

detecting gamma rays induced by activation with said detector; and generating a second count rate signal responsive to gamma rays detected at said second velocity;

producing first and second relative velocity signals related in value to said first and second relative velocities, respectively;

producing a logging signal related in value to the salinity of water in the fluids produced from the portion of the borehole responsive to said first and second count rate signals and said first and second relative velocity signals; and recording said logging signal.

2. The method of claim 1 wherein the logging sonde is moved at said first relative velocity during a first pass through the portion of the borehole at a logging speed $v_{L,1}$ and wherein the logging sonde is moved at said second relative velocity during a second pass through the portion of the borehole at a logging speed $v_{L,2}$, which is different from the logging speed $v_{L,1}$.

3. The method of claim 2, wherein said step of producing the first and second relative velocity signals itself comprises the steps of:

producing signals related in value to the logging speeds ($v_{L,1}$, $v_{L,2}$) of the sonde through the borehole; and producing a signal related in value to a displacement distance traversed by the sonde between irradiation of the fluids and detection of gamma rays induced by activation; and producing a signal related in value to the relative velocity between the sonde and the irradiated fluids responsive to said signals related in value to $v_{L,1}$, $v_{L,2}$, and the displacement distance.

4. The method of claim 3, wherein the indications of first and second relative linear flow velocities $v_1$, $v_2$ are obtained from predetermined relationships relating displacement distance and logging speed to relative velocity.

5. The method of claim 1, wherein said logging signal is produced responsive to sonde calibration constants determined empirically.

6. The method of claim 5, wherein said calibration constants include constants determined in a calibration facility into which fluids are introduced having different, known salinities.

7. The method of claim 5, wherein said calibration constants include a tool geometric factor determined in a calibration facility into which fresh water is introduced.

8. The method of claim 5, wherein said calibration constants include source strength and detector efficiency constants.

9. The method of claim 1, wherein said activation of oxygen, sodium and chlorine is as follows:

$O^{16}(n,p)N^{16}$
$Na^{23}(n,\alpha)F^{20}$
$Cl^{37}(n,\alpha)P^{34}$.

10. The method of claim 1 wherein a normalization factor $K(W_s)$, functionally related to water salinity $W_s$, is determined by solution of a simultaneous equation relating first and second relative velocities, $v_1$ and $v_2$ and the detected first and second count rates $C(v_1,W_s)$ and $C(v_2, W_s)$.

11. The method of claim 10 wherein the normalization factor $K(W_s)$ is related to water salinity $W_s$ by the expression $$W_s = bK(W_s) + c(K(W_s))^2$$

where b and c are empirically determined constants.

12. The method of claim 11 wherein said logging signal is produced responsive to pre-determined sonde parameters including:

source strength, $N_S$;
detector sensitivity, $N_G$; and
geometrical factor, $K_F$.

13. The method of claim 12 wherein said logging signal is produced responsive to a cross-sectional area of a casing-sonde annulus, and further comprising the step of determining a cross sectional area of the casing of the portion of the borehole and determining therefrom the cross-sectional area A of the casing-sonde annulus.

14. The method of claim 13 wherein the solution of the simultaneous equation is made in accordance with the expression:

$$K(W_s) = \frac{C_{(v2, W_s)}X_1 - C_{(v1, W_s)}X_2}{C_{(v1, W_s)}Y_2 - C_{(v2, W_s)}Y_1}$$

where $X_1 = N_S N_G K_F A F_O(v_1)$;

$X_2 = N_S N_G K_F A F_O(v_2)$;

$Y_1 = N_S N_G K_F A (F_{Na}(v_1) + F_{Cl}(v_1))$;

$Y_2 = N_S N_G K_F A (F_{Na}(v_2) + F_{Cl}(v_2))$;

and $F_O$, $F_{Na}$ and $F_{Cl}$ are factors dependent on duration of fluid irradiation and decay constants of the induced activation.

15. The method of claim 1 wherein the neutron irradiation from the source is pulsed.

16. The method of claim 1, wherein water phase flow rate $V_W$ is determined from the expression $$V_W = P_w A v$$

where $P_w$ = fractional water cut of the liquid production phase of the borehole determined from said first and second relative velocities and said first and second count rates;

A = cross sectional area of the casing-logging tool annulus; and v = flow velocity of the production fluid.

17. A method for logging an indication of the water fraction of fluids produced from a portion of a borehole, comprising the steps of:

irradiating fluids in the portion of the borehole with periodic pulses of neutrons from a neutron source carried by a logging sonde, said neutrons being sufficiently energetic to induce activation of oxygen, sodium and chlorine in said fluids;

detecting gamma rays induced by said activation with at least one detector carried by the sonde;

performing said irradiating and detecting at first and second relative velocities between the sonde and the irradiated fluids at said portion of the borehole and generating first and second count rate signals responsive to gamma rays detected at said first and second relative velocities respectively;

producing first and second relative velocity signals related in value to said first and second relative velocities, respectively;

producing a logging signal related in value to the water fraction $P_w$ of the fluids produced from the portion of the borehole responsive to said first and second count rate signals and said first and second relative velocity signals, respectively; and recording said logging signal.

18. The method of claim 17, wherein the indication of the water fraction of fluids produced from a portion of the borehole is related to the water phase flow rate $V_w$ by the expression $$V_w = P_w A v$$

where:
A = cross sectional area of the casing-logging tool annulus; and
v = linear flow velocity of production fluid.

19. A method for logging an indication of the water fraction and salinity of fluids produced from a portion of a borehole, comprising the steps of:

irradiating fluids in the portion of the borehole with neutrons from a neutron source carried by a logging sonde, said neutrons being sufficiently energetic to induce activation of oxygen, sodium and chlorine in said fluids;

detecting gamma rays induced by said activation with at least one detector carried by the sonde;

performing said irradiating and detecting at first and second relative velocities between the sonde and the irradiated fluids at said portion of the borehole and generating first and second count rate signals responsive to gamma rays detected at said first and second relative velocities, respectively;

producing first and second relative velocity signals related in value to said first and second relative velocities, respectively;

producing logging signals related in value to the water fraction and salinity of fluids produced from the portion of the borehole responsive to said first and second count rate signals and first and second relative velocity signals, respectively; and recording said logging signals.

20. The method of claim 19 wherein the neutron irradiation from the source is pulsed.

* * * * *